(12) United States Patent
Takahashi et al.

(10) Patent No.: US 6,567,364 B1
(45) Date of Patent: May 20, 2003

(54) MULTI-TRACK DISK REPRODUCING APPARATUS AND REPRODUCING METHOD THEREOF

(75) Inventors: Yorio Takahashi, Ehime (JP); Tadahiko Ichikawa, Ehime (JP); Hitoshi Fujimoto, Ehime (JP)

(73) Assignee: Matsushita Electric Industrial Co., Inc., Osaka (JP)

( * ) Notice: Subject to any disclaimer, the term of this patent is extended or adjusted under 35 U.S.C. 154(b) by 0 days.

(21) Appl. No.: 09/622,243

(22) PCT Filed: Dec. 13, 1999

(86) PCT No.: PCT/JP99/06979

§ 371 (c)(1),
(2), (4) Date: Oct. 25, 2000

(87) PCT Pub. No.: WO00/36595

PCT Pub. Date: Jun. 22, 2000

(30) Foreign Application Priority Data

Dec. 15, 1998 (JP) .......................................... 10/355663

(51) Int. Cl.[7] ................................................. G11B 7/00
(52) U.S. Cl. ............... 369/95; 369/124.02; 369/124.03; 369/30.23
(58) Field of Search .......................... 369/95, 124.02, 369/124.03, 124.07, 124.08, 30.23

(56) References Cited

U.S. PATENT DOCUMENTS 5,448,048 A * 9/1995 Mitsuo ...................... 369/30.1

FOREIGN PATENT DOCUMENTS

JP 4-195972 7/1992
JP 9-22533 1/1997

OTHER PUBLICATIONS

International Search Report corresponding to application No. PCT/JP99/06979 dated Mar. 14, 2000 (w/ English translation).

* cited by examiner

Primary Examiner—Nabil Hindi
(74) Attorney, Agent, or Firm—RatnerPrestia

(57) ABSTRACT

Spiral tracks are formed on a recording surface of an information disk such as an optical disk, and data is recorded by interleaving technique as well as adding error correction information. A disk driver rotates the information disk at a specified speed. Plural tracks are read simultaneously by a reading device. Analog data of the plural lines are converted into digital data by an A/D converter, and stored in a frame data buffer memory by each line. The data are respectively decoded sequentially in a decoder. When the disk makes one rotation, the data of next track is read in duplicate as much as the portion of the interleaving length of the tail data of each one of the plural tracks being read on the information disk. By data aligning means, according to a command from a controller, the data—corresponding to the number of tracks that can be read simultaneously—being output in parallel from the decoder are aligned sequentially from the head data on the information disk. The data corresponds to the number of tracks that can be read simultaneously. The data output means outputs valid data out of the data aligned by the data aligning means to the outside of the device by the command from the controller.

34 Claims, 5 Drawing Sheets

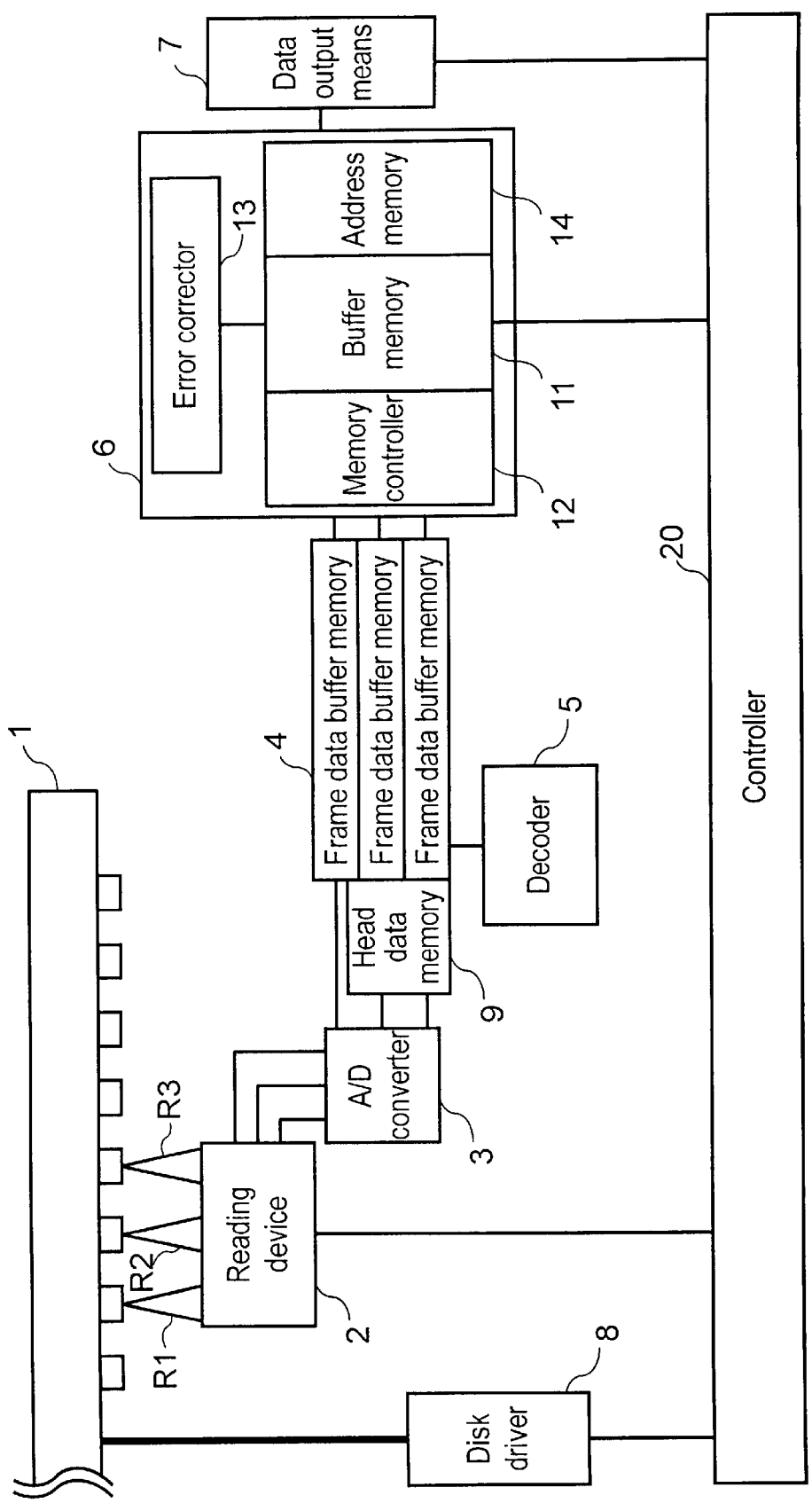

MULTI-TRACK DISK REPRODUCING APPARATUS AND REPRODUCING METHOD THEREOF

THIS APPLICATION IS A U.S. NATIONAL PHASE APPLICATION OF PCT INTERNATIONAL APPLICATION PCT/JP99/06979.

DESCRIPTION

1. Technical Field

The present invention relates to an information disk device and its reading method, and more particularly to a disk reproducing apparatus for simultaneous reading of data in plural tracks of an optical disk used in a CD-ROM or the like, and a method of reading the same.

2. Background Art

In an optical disk device such as CD-ROM device, recently, a high-speed reading function is required. As a method of realizing this, a multi-track disk reproducing apparatus for simultaneously reading data in plural adjacent tracks has been proposed. Hitherto, in the case of reading out data by a multi-track disk reproducing apparatus, a method disclosed in U.S. Pat. No. 5,627,805 has been known. This method is characterized that the data being read out from plural tracks are, after EFM demodulation, once stored in a buffer memory of a large capacity, and aligned in the sequence on the disk, and decoded according to CIRC sequentially from the head data. In the case of CD-ROM data, after CIRC decoding, further, ECC error correction is made on the buffer memory, and the output is sent into the host computer through interface means.

In the CIRC coding method of CD, in order to cope with a local disk defect, the data is recorded by a technique called interleaving, as being distributed in 108 CD frames at maximum. Accordingly, the data is stored in a buffer for frame data sequentially from the beginning, and corresponding bit data is extracted from the distributed-recorded data, and the corresponding data needs to be decoded by putting it into the decoding circuit. Therefore, in the method disclosed in U.S. Pat. No. 5,627,805, it is required to prepare a buffer memory for frame data of at least the amount of one rotation of disk×the number of tracks that can be read simultaneously. Further, in the case of CD, which is recorded at a constant linear speed, the data memory capacity per a rotation of disk is greater in the outer periphery of the disk than in the inner periphery. Therefore, it requires a buffer memory for frame data having of the maximum recording capacity per rotation.

However, since the data before CIRC decoding contains error correction information, the data redundancy is great, and a memory of a larger capacity is needed, and hence the cost is higher. Yet, until the data of one rotation is read out completely, decoding data in the second track and after cannot be started. After reading out the data of one rotation, when restarting reading by advancing the track, undecoded data is left over in the buffer memory for frame data. Therefore, reading cannot be not restarted until decoding the data is completed, or an extra buffer memory for frame data must be preserved. In the latter case, it is necessary to prepare a buffer memory for storing data of a large redundancy including the error correction information before CIRC decoding as mentioned above, and the efficiency is very poor.

DISCLOSURE OF THE INVENTION

To solve the problems, the invention presents a multi-track disk reproducing apparatus for reproducing simultaneously signals of adjacent plural tracks on an information disk having plural tracks formed spirally on a recording surface, and recording data coded by using an interleaving technique as well as adding error correction information. The appratus comprises signal reproducing means for reproducing signals of adjacent plural tracks simultaneously from an information disk, data converting means for converting output signals read from the plurality of tracks into digital data, memory means for storing the converted data read from the plurality of tracks longer than the interleaving length, decoding means for decoding and outputting desired data from the data stored in the memory means, data aligning means for aligning the data output in parallel in the sequence of addresses on the information disk, and data output mans for outputting the aligned valid data to the outside of the disk reproducing apparatus.

According to the invention, the buffer memory for storing before-decoding coded data by the interleaving technique of a larger redundancy requires only the capacity of minimum limit necessary for decoding. The data reduced in redundancy is aligned on the buffer memory, so that the buffer memory in the entire system can be further decreased in capacity. Moreover, decoding can be done in parallel by each track. Also, it is not necessary to wait for rotation of the disk until the desired data comes to the position of the reader at the time of advancing the track to be reproduced by making a track-jump after reading the data of one rotation, as well as at the time of restarting reading after moving the reader in the signal reproducing means from a remote track. Thus the data can be reproduced efficiently.

BRIEF DESCRIPTION OF THE DRAWINGS

FIG. 5 is a block diagram of a multi-track disk reproducing apparatus in the case of application of the invention in a CD-ROM device.

DETAILED DESCRIPTION OF PREFERRED EMBODIMENTS

Embodiment 1

A first embodiment of the invention is described below while referring to FIG. 1.

Figure 1:
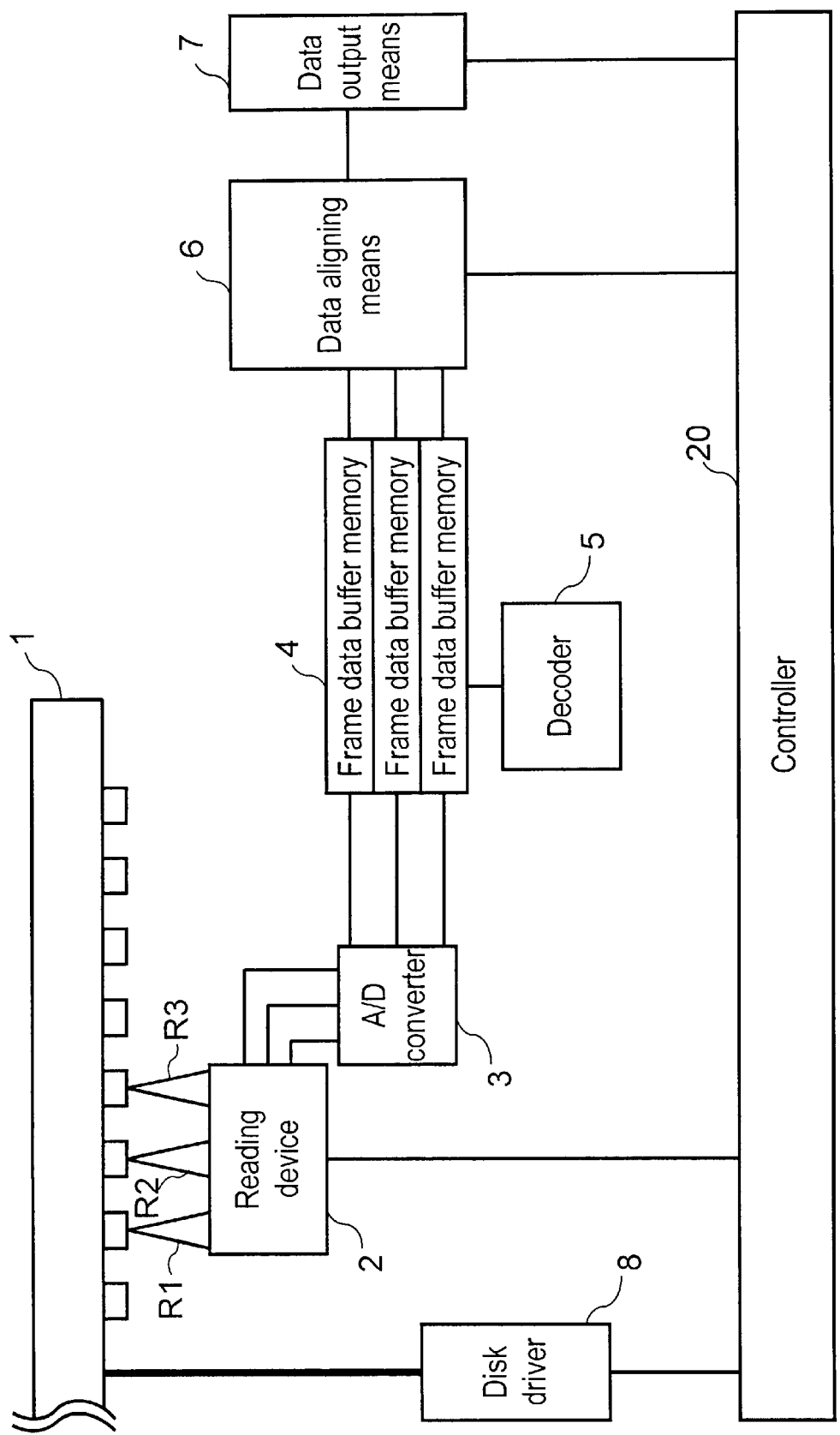
FIG. 1 is a block diagram of a multi-track disk reproducing apparatus in embodiment 1 of the invention.

In FIG. 1, an information disk 1 is, for example, an optical disk, in which spiral tracks are formed on its recording surface, and data is recorded by interleaving technique as well as adding error correction information. A disk driver 8 is, for example, a disk rotating motor, which rotates the information disk 1 at a specified speed according to a command from a controller 20. A reading device 2 is, in the case of optical disk, for example, composed of plural readers R1, R2, R3 formed of laser beam and photo detectors, and a head amplifier not shown, in an optical pickup device capable of reproducing simultaneously information in plural tracks. The reading device is installed so as to be movable in the radial direction of the information disk 1 controlled by the controller 20. The reading device reproduces simultaneously the data in plural adjacent tracks in which information is recorded, and outputs analog reproduction signals from the number of tracks that can be reproduced simultaneously. An A/D converter 3 has converting circuits for the number of tracks that can be reproduced simultaneously. The A/D converter converts analog signals in plural lines reproduced by the reading device 2, which can be reproduced simultaneously, into digital signals, and outputs them. Using one circuit, alternatively, processing by time-sharing is also possible. As a frame data buffer memory 4, for example, a ring buffer memory is used. The frame data buffer memory can store digital data output from the A/D converter 3, which is digital data in the number of tracks that can be reproduced simultaneously, more than the interleaving length of the information disk 1. When the frame data buffer memory 4 is full of data, new data is sequentially written over the previous written data. A decoder 5 extracts necessary bit data from the data stored in the frame data buffer memory 3, and corrects error, decodes and outputs it. Data aligning means 6 aligns the data output in parallel from the decoder 5, which are in the number of tracks able to be read simultaneously, sequentially from the head data on the information disk 1 on the basis of the command from the controller 20. Data output means 7 issues valid data out of the data aligned by the data aligning means 6 to the outside of the device by the command from the controller 20. The controller 20 controls the disk driver 8, reading device 2, data aligning means 6, and data output means 7.

Next the operation is explained. The reading device 2 traces and reads the data in the number of tracks that can be read simultaneously, sequentially from the beginning according to the rotation of the information disk 1. The analog data of each line is converted into digital data by the A/D converter 3, and stored in the frame data buffer memory 4 by each line and sequentially decoded in the decoder 5. When the disk makes one rotation, the readers of the reading device 2 reach the beginning of next track respectively. At this time, since the data being read at the beginning of next track is not present yet in the frame data buffer memory 4. Therefore, in order to decode the data in each track completely to the end for obtaining continuous data without interruption in each track on the data aligning means 6, the data of next track is read in duplicate as much as the portion of the interleaving length of each tail data of plural tracks being read in the information disk 1. By the data aligning means 6, the data being output in parallel from the decoder 5, which is in the number of tracks that can be read simultaneously, is sequentially aligned from the head data on the information disk 1 on the basis of the command from the controller 20. The data output means 7 outputs valid data out of the data aligned by the data aligning means 6 to the outside of the device by the command from the controller 20.

In this manner, the capacity of the frame data buffer memory 4 may be a minimum limit, and the data in each track that can be read simultaneously can be efficiently processed in parallel. Therefore, the required capacity of one track of the buffer memory 4 is only the capacity enough to store the data in the sum of interleaving length plus the margin. The detail is explained below.

Figure 4:
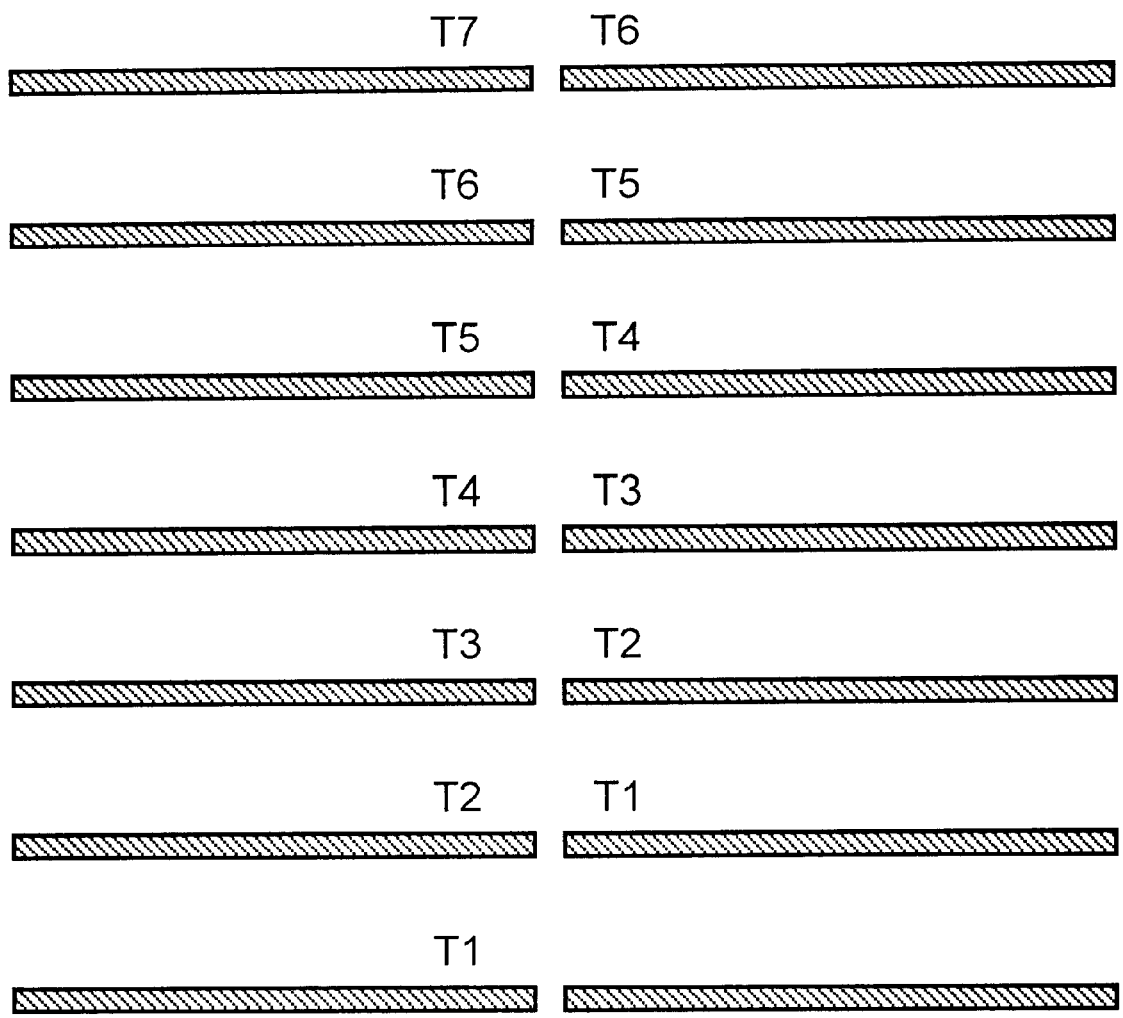
FIG. 4 is a track layout of an information disk forming tracks spirally on a recording surface.

The operation of the readers is described in detail by referring to the track layout of the information disk in which spiral tracks are formed on the recording surface in FIG. 4. FIG. 4 shows tracks T1 to T7 of the disk 1. For example, in the case of an apparatus capable of reproducing information of three tracks simultaneously, the readers R1, R2, R3 composed of three sets of a laser beam and a photo detector in the pickup device are supposed to trace the disk from the right side. First, the tracks T1, T2, T3 are read by the readers R1, R2, R3, and sequentially decoded by the decoder 5, and decoded data are sent into the data aligning means 6. After reading each track, the data is read to the beginning of tracks 2, 3, 4 which are the interleaving portions, and the data is decoded to the tail of tracks T1, T2, T3. In this state, each pickup device is on the tracks T2, T3, T4. Next, the reading device 2, in order to start reading from the unread portion of track 4, causes the readers R1, R2, R3 to jump to next track, and traces tracks T3, T4, T5. If it is possible to make track jump instantly, by jumping two tracks, the reader R1 may read the data consecutive to the already read portion of track T4. However, since the disk 1 is rotating during the track jump, by jumping one track, tracing is started from tracks T3, T4, T5. Then, the tracks T4, T5, T6 are reproduced completely, then advancing to the beginning portion of tracks T7, T8, T9 which are the interleaving portions of tracks T4, T5, T6, one track is jumped to next, and this operation is repeated sequentially.

Herein, the decoding circuits in the decoder 5 may be provided as much as the number of tracks that can be reproduced simultaneously. The number of the decoding circuits may be smaller than that of tracks that can be reproduced simultaneously. Then the data of each track is decoded sequentially and output as the data of corresponding track, so that the number of decoding circuits may be curtailed if the speed of the decoding circuit is enough.

As explained herein, in this embodiment, the capacity of the buffer memory may be a minimum required limit for decoding and storing the head data of track, and decoding can be proceeded simultaneously in each track, so that the data can be reproduced efficiently.

In this explanation, the information disk 1 is an optical disk, but it may be similarly executed in the case of a magnetic disk. The reading device 2 is composed of optical pickups and head amplifiers, but it may be also composed of magnetic heads and head amplifiers.

Embodiment 2

Figure 2:
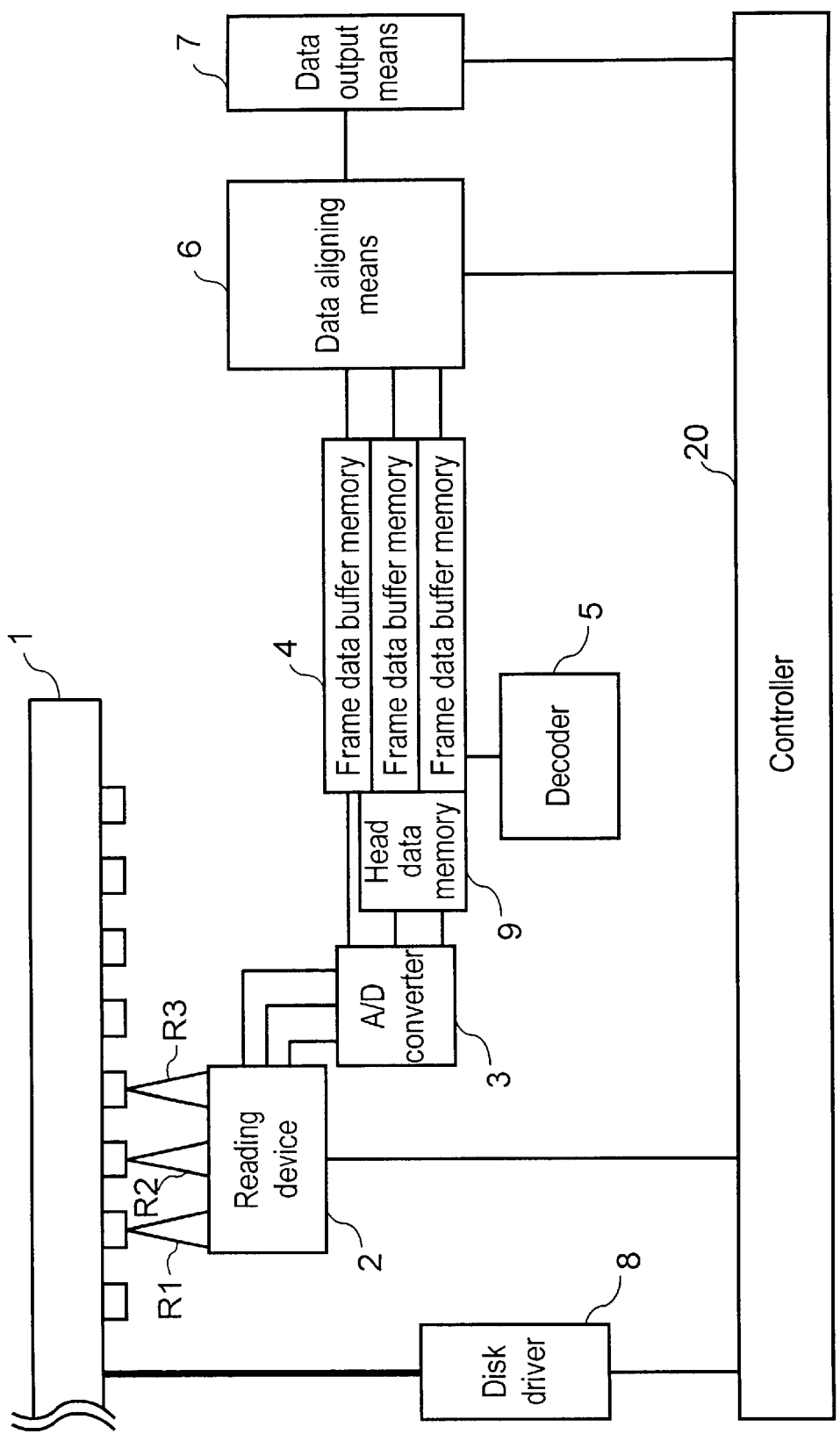
FIG. 2 is a block diagram of a multi-track disk reproducing apparatus in embodiment 2 of the invention.

A second embodiment of the invention is described while referring to FIG. 2.

In FIG. 2, the same functional parts as in FIG. 1 are identified with the same reference numerals, and duplicate explanation is omitted. What differs from FIG. 1 is the addition of a head data memory 9, which stores the head data of each track out of the data stored in the frame data buffer memory 4 more than the interleaving length of the tail data of the preceding track.

Next the operation is explained. The reading device 2 traces and reads the data in the tracks that can be read simultaneously, sequentially from the beginning according to rotation of the disk, and the decoder 5 decodes the data sequentially. When the disk makes one rotation, the plural readers of the reading device 2 reach the beginning of next track respectively. Then the data stored in the head data memory 9 is used as the data to be connected to the tail data of each track. It makes the data in each track decoded completely to the end, so that the data in each track is formed as continuous data without interruption on the data aligning means 6. However, the tail data of the final track is discarded because there is no data of the track to be connected. Of the head data memory 9, the head data memory of the foremost track is not necessary and may not be provided.

Thus, by providing a region for storing the head data of each track, it is not necessary to read in duplicate the data of next track for the re length of the tail data of each track of the information disk 1 as in embodiment 1. Therefore the data reading can be processed more efficiently.

The decoders 5 may be provided with the number of tracks that can be reproduced simultaneously. Also the number of the decoders may be smaller than the number of tracks that can be reproduced simultaneously. Then the data in each track is sequentially decoded and output as data of the corresponding track, so that the number of decoders may be curtailed if the speed of the decoder is sufficient.

As explained herein, also in this embodiment, the capacity of the buffer memory may be a minimum required limit for decoding and storing the head data of track. The data can be reproduced more efficiently than in embodiment 1.

In this explanation, the information disk 1 is an optical disk, but it may be similarly executed in the case of a magnetic disk. The reading device 2 is composed of optical pickups and head amplifiers, but it may be also composed of magnetic heads and head amplifiers.

Embodiment 3

Figure 3:
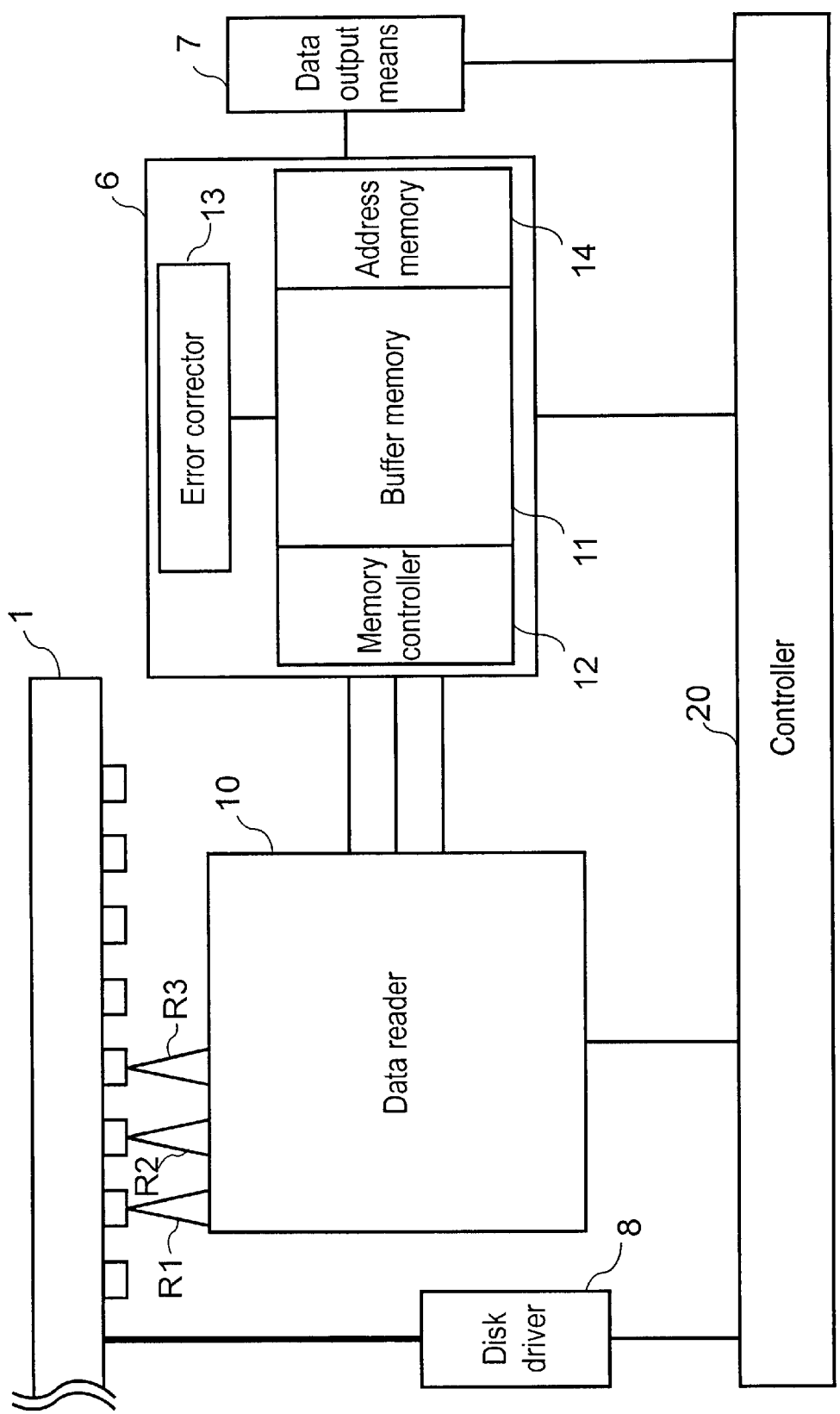
FIG. 3 is a block diagram of a multi-track disk reproducing apparatus in embodiment 3 of the invention.

A third embodiment of the invention is described while referring to FIG. 3.

In FIG. 3, the same functional parts as in FIG. 1 are identified with the same reference numerals, and duplicate explanation is omitted. What differs from FIG. 1 is the addition of a data reader 10, which includes the reading device 2, A/D converter 3, frame data buffer memory 4 and decoder 5 in FIG. 1, and may also include, if necessary, the head data memory 9 in FIG. 2. The data reader 10 reproduces simultaneously the data recorded on the information disk 1, according to a command from the controller 20, and decodes the digital data of each track to output. The data aligning means 6 includes a buffer memory 11, a memory controller 12, an error corrector 13, and an address memory 14, and the buffer memory 11 sequentially stores the digital data issued from the data reader 10. Based on the beginning address information of the data of each track, the memory controller 12 determines the beginning address of each track on the buffer memory so as for it to be continuous with the data of the track to be connected after one rotation of the disk, on the buffer memory 11. (buffer memory address determining means). The memory controller writes the reproduced digital data sequentially into the buffer memory 11 (memory writing means). The error corrector 13 corrects error if an error is found in the aligned data in the block of a specific length, regardless of the track sequence of the reading tracks, when the data stored in the information disk 1 is recorded in the block unit of specific length by adding block completion type error correction code. Then the error corrector overwrites the result of correction on the original data. The address memory 14 stores the tail address on the buffer memory which is connected to the data of the foremost track of the reading tracks and its continuity from the head data is maintained. When the data stored in the information disk 1 has been recorded by adding a block completion type error correction code in the block unit of a specific length, the address memory stores the tail address on the buffer memory of the block. The block is connected to the data of the foremost track of the reading tracks, so that the continuity from the head data is maintained. Further, the block is without error or after error correction. The data output means 7 outputs the data up to the address stored in the address memory 14, out of the data on the buffer memory 11, as valid data to the outside of the device. The controller 20 controls the disk driver 8, reading device 2, data aligning means 6, and data output means 7.

Herein, the data reader 10 may be specifically executed in the method explained in embodiment 1 and embodiment 2. Otherwise it may be similarly executed in the case of the information disk not applying the coding method using the interleaving technique as well as the error correction information in a previous stage, or if it is possible-to output in parallel the data after decoding in the coding method by interleaving technique.

The capacity of the buffer memory 11 requires, at least, the maximum data quantity of one rotation×the number of tracks that can be read simultaneously, in order to align the read data. In order to read more efficiently, when advancing the reproduction track after reading the data of one rotation, the data already aligned but not output to the outside of the reproducing apparatus is left over on the buffer memory 11. Therefore, it further requires a buffer memory capacity of the maximum data quantity of one rotation×(the number of tracks that can be read simultaneously−1). However, in the case of the information disk in which data is recorded by interleaving technique as well as adding error correction information, the required capacity of the buffer memory for data alignment is smaller than in the case of a method of aligning directly the data of high redundancy including the error correction information. Also the buffer memory 11 serves as the buffer memory for data transfer. Hence no extra buffer memory for data transfer is required, and a buffer memory for data transfer of a large capacity is obtained, so that the data can be output efficiently to the outside of the reading device.

In this embodiment, as described above, the data can be reproduced efficiently owing to the following reasons.

i) The data being read out simultaneously can be aligned sequentially from the head data on the buffer memory.

ii) While the data being read out simultaneously are aligned sequentially from the head data on the buffer memory, block completion type error correction in a block unit of a specific length can be processed, from the data aligned in the block unit, regardless of the data sequence.

iii) Decoding of coded data by interleaving technique, and block completion type error correction in a block unit of a specific length can be executed simultaneously. After decoding data coded by interleaving technique as well as adding error correction information, data are sequentially aligned from the head data on the buffer memory.

Further, in this embodiment, the buffer memory is required to have a capacity of a minimum limit necessary for decoding, and the data of smaller redundancy is aligned on the buffer memory, so that the buffer memory capacity can be curtailed in the entire system.

Embodiment 4

A fourth embodiment of the invention is described by referring to FIG. 3 used in explanation of embodiment 3, and FIG. 4 showing a track layout of information disk having spiral tracks formed on the recording surface.

In FIG. 4, T1, T2, T3, . . . are data tracks on the disk 1, and are connected to T2, T3, T4, . . . respectively, after the disk makes one rotation. In the following explanation, the number of tracks that can be read simultaneously is three. The readers R1, R2, R3 in the pickup device trace T1, T2, T3 from right to left side in the diagram. After the readers read T1, T2, T3, they make track jump in order to advance the reproduction tracks, but track jumping takes a certain time. In this period, the disk continues to rotate. Hence it is difficult to restart reproduction at the beginning position of T4, T5, T6, or before the beginning position. Accordingly, in order to read T3 in duplicate, jumping one track, it is designed to jump to tracks T3, T4, T5. When ready to read after the track-jump, in T4 and T5, data reading starts immediately. The reader R1 in the pickup device of the data reader 10 jumped to T3 traces the duplicate data until the next data to the data being read before the track-jump, and written on the buffer memory 11 comes up. The reader R1 restarts reproduction when the unread data comes up. At this time, reading of duplicate data may be continued, and it may be overwritten on the buffer memory 11.

When newly starting reading of data, or when reading data at a position remote from the position being read so far, for example, assume that data needs to be read from the head data of track T2. First, the pickup device of the reading device of the data reader 10 is moved to search a desired track. The disk is rotating during the search action. Therefore it is not certain to start reading from which position during rotation of the disk 1. Accordingly, reading tracks are assigned so as to read the tracks T1, T2, T3 by the readers R1, R2, R3 in the pickup device. In the same way as in the case of advancing the reading tracks, reading of tracks T2 and T3 is started right after search action. The reader R1 in the pickup device of the reading device assigned to track T1 is not certain to start reading from which position on the track T1 because the disk 1 is rotating during the search. However, it securely reaches the beginning of the intended track T2 within one rotation of the disk. Therefore, reproduction may be restarted from the moment of reaching the beginning of the track T2. If necessary to read out data again after one rotation of the disk, data reading is continued by track jumping.

Herein, the data reader 10 can be specifically executed in the method explained in embodiment 1 and embodiment 2. Otherwise it may be similarly executed in the case of the information disk not using the coding method applying the interleaving technique as well as adding the error correction information in a previous stage, or if it is possible to output in parallel the data after decoding in the coding method by interleaving technique. In this example, the number of tracks that can be read simultaneously is three, but it is executed similarly if the number of tracks that can be read simultaneously is two, or more than three.

As above explained, according to the embodiment, when advancing the reproduction track by the track jumping after reading the data of one rotation, or when restarting reading after moving the reader from a remote track, it is not necessary to wait for rotation of the disk until the intended data comes to the position of the reader, so that the data can be reproduced efficiently.

A specific example of the invention is explained in FIG. 5, taking a CD-ROM reproducing apparatus for example. In this example, data in three adjacent tracks can be reproduced simultaneously.

In FIG. 5, the information disk 1 is specifically a disk conforming to CD or CD-ROM standard. In the disk, spiral tracks are formed on the recording surface, error correction information called C1, C2 is added, and the data is recorded in maximum 108 CD frames of interleaving length by interleaving technique. The disk driver 8 is a disk rotating motor for rotating the disk, and it rotates the information disk 1 at a specified speed on the basis of the command from the controller 20. More specifically, various variations can be considered, such as 10-times speed rotation by CLV control; and in the internal peripheral, about 10-times speed and in the external peripheral, 24-times speed rotation by CAV control. In this example, by the typical CAV control in the present CD-ROM industry, the disk rotation is controlled so that the speed may be 24 times on the outermost periphery of the disk. The reading device 2 comprises the optical pickup and head amplifier circuit. The three readers R1, R2, R3 in the optical pickup move reciprocally in the radial direction of the information disk 1 on the basis of the command from the controller 20 to reproduce simultaneously the data in three adjacent tracks of the recorded track, thereby issuing three analog reproduction signals.

The A/D converter 3 converts the three analog signals reproduced in the reading device 2 into digital signals, and outputs the data after further EFM demodulation. The frame data buffer memory 4 is a ring buffer memory. It stores three digital data output from the A/D converter 3 by more than the interleaving length of the information disk 1. When the buffer is full of data, the earlier written data is sequentially replaced by the new data by overwriting. The head data memory 9 stores the head data of each track excluding the foremost track, by more than the interleaving length of the tail data of the preceding track, out of the data stored in the frame data buffer memory 4. The decoder 5 extracts necessary bit data from the data stored in the frame data buffer memory 4, and outputs the data after making CIRC decoding and error correction.

In the same as in FIG. 3, the reading device 2, A/D converter 3, frame data buffer memory 4, decoder 5, and head data memory 9 are collectively called the data reader 10.

The decoder 5 provides one decoder for three tracks that can be reproduced simultaneously. The data in the frame data buffer memory 4 of each track is sequentially decoded and output as data of corresponding track. In the data aligning means 6, the buffer memory 11 sequentially stores the decoded digital data output from the decoder 5 in the data reader 10. In this example, 256 Kbytes is stored, and addresses 0000H to 40000H are assigned. Based on the head address information of the data of each track, on the buffer memory 11, the memory controller 12 determines the head address of each track on the buffer memory 11 so that the data on a certain track may be continuous with the data of a track coming next to this track after one rotation of the disk 1. The memory controller writes the reproduced digital data sequentially into the buffer memory 11. The error corrector 13 corrects error, if an error is found in the sector gathering data of 2352 bytes in one sector, regardless of the sequence of reading tracks, when the data recorded in the information disk 1 is CD-ROM mode 1 data and includes block completion type error correction information called ECC in the unit of 2352 bytes in one sector. The error corrector overwrites the correction result on the original error data. Then the address memory 14 stores the tail address on the buffer memory which is connected to the data of the foremost track of the reading tracks, and of which continuity from the head data is maintained. In the case that the data stored in the disk is CD-ROM mode 1 data, and includes block completion type error correction information called ECC in the unit of 2352 bytes in one sector, the address memory stores the tail address on the buffer memory of the block. The block is connected to the data of the foremost track of the reading tracks, and the continuity from the head data is maintained. Further, the block is free from error or after error correction. The data output means 7 outputs the data up to the address stored in the address memory 14 on the buffer memory 11, to the outside of the device as valid data. The controller 20 controls the disk rotation of the disk driver 8, controls the position in the radial direction of the reading device 2, controls the operation of the data aligning means 6, and controls the data output of the data output means 7.

The actual reading operation is explained by referring to FIG. 4 and FIG. 5. The following explanation is made in the case that the number of tracks being able to be read simultaneously is three.

First, starting of reading new data is explained. Assuming that it is needed to start reading from the head data of track T2, the readers R1, R2, R3 in the pickup device of the reading device 2 are operated to search desired tracks. However, during searching operation, the disk is rotating. Therefore, it is not certain to start reading from which position during one rotation of the disk 1. Accordingly, reading tracks are assigned so that the readers of the reading device 2 may read data at any position in the midst of tracks T1, T2, T3. The readers assigned to the tracks T1, T2, T3 are supposed to be R1, R2, R3, respectively. The readers R1, R2, R3 can read data from an intermediate position of the tracks T1, T2, T3. The readers R2 and R3 start reading data from the midst of tracks T2 and T3. The reader R1 starts reading data from the beginning of the track T2 because the reader R1 comes to the beginning of the track T2 comes around within one rotation of the information disk 1.

Once reading is started, the data of each track is sequentially A/D converted and EFM demodulated in the A/D converter 3, and stored in the ring buffer memory 4 for frame data. When the data is stored in the ring buffer memory 4 for frame data by more than 108 CD frames corresponding to the interleaving length, CIRC decoding and C1, C2 error correction are carried out in the decoder 5, and the data is output into the buffer memory 11. Where the head data memory 9 is provided, the data of the beginning 107 CD frames read by the readers R2, R3 is stored in the head data memory 9. On the buffer memory 11, the radii of the tracks T2, T3, T4 are considered to be nearly equal. Then, assume that the data capacity per rotation of each track is 900 CD frames, about 21 Kbytes, and the reader R2 starts reading from the position of the 400th CD frame from the beginning of the track T2. Then the memory controller 12 is assigned with R1: 00000H to 02568H, RS: 02569H to 079C9H, and R3: 079CAH and so forth as the addresses on the buffer memory, for the data being read by the readers R1, R2, R3. The error corrector 13, if the data is CD-ROM data and includes error correction information of block completion type called ECC, checks error from the sector gathering data of 2352 bytes in one sector, and corrects the error. In the case that the data is connected to the data read by the reader R, so that the continuity is maintained, and further the data is CD-ROM data and includes error correction information of block completion type called ECC, the address memory 14 stores the tail address on the buffer memory of the data without error or after completion of error correction. Then the data output means 7 outputs the data up to the address stored in the address memory 14 on the buffer memory 11, to the outside of the device as valid data.

After the readers R2, R3 have started reading of data, the disk makes one rotation, and the readers R1, R2 come to the reading start points of R2, R3, and at this time if the head data memory 9 is not provided, the data of each track is decoded to the end. In order to keep the data continuous with the data of next track, further 107 CD frames are read in duplicate. If the head data memory 9 is provided, since the data of the beginning 107 CD frames being read by the readers R2, R3 are stored in the head data memory 9. Therefore, the data is used as the tail data of the readers R1, R2, so that the data is continuous with the data being read out by the readers R1 and R2, and R2 and R3 without interruption.

In the example above, assume the case that the error correction information of block completion type called ECC is not included. Then, at the time that the data of 00000H to 02568H on the buffer memory 11 being read by the reader R1 is gathered, assume that the data of 02569H and so forth being read by the reader R2 further includes the data of up to 079C9H of the reader R2. Then the data of 079CAH and so forth being read by the reader R3 is valid. Also, assume the case that the error correction information of block completion type called ECC is included. Similarly, when the data of 00000H to 02568H on the buffer memory 11 being read by the reader R1 is gathered, error is checked in the data from 024C1H to 02DF0H in the range of the readers R1, R2, and the subsequent data is valid when no error is found or after error correction.

At this time, as explained above, data decoding and error correction is made from the data gathered as required. When the disk makes one rotation and data of one track is read, data decoding and error correction are almost completed. Therefore, if reading error occurs, there is low probability of attempting reading again by returning the reading tracks after once advancing the reading tracks. Thus, the efficiency of use of the decoder is always almost constant, so that data reading, decoding and error correction can be promoted efficiently.

Next, to advance the reading tracks, a track-jump is made, but the track-jump requires a certain time. In this period, the disk is still rotating. Accordingly it is difficult to cause the reader R1 to make a track-jump to an intermediate position of the final track T4 being read by R3 and start reading. Or, if the head data memory 9 is not provided, upon start of track jumping, R1 is already advanced from the desired reading start point by 107 CD frames. Accordingly, in order that the reader R1 covers in duplicate the already read tracks, R1, R2 and R3 are caused to jump to tracks T4, T5, T6. After the track-jump, similarly, the readers R2, R3 immediately restart reading. The reader R1 may immediately restart reading, and overwrite on the data being read before the track-jump, or may compare with the already read data. If a reading error occurs in this duplicate portion, the R1 may attempt reading again while the R2 and R3 continue to read the unread portions. Or, until the unread region comes around, the R1 may not read. Similarly, hereinafter, reading operation continues while making the track-jumps.

In this method, in the case of rotating the disk by CAV control at maximum 24-times speed in this example, the number of tracks that can be read simultaneously is three right after a search, and reading is possible at about two times or three times faster than in the conventional method, or about two times faster when advancing the reading tracks. Therefore, on the outermost periphery, reading at about 48-times speed is possible. Assume the case that the number of tracks that can be read simultaneously is more than three, or the case of CLV control. Then, similarly, it is possible to read the data at speed of about N−1 times (N being the number of tracks that can be read simultaneously) as compared with the case in which the number of tracks that can be read simultaneously is one.

The frame data buffer memory 4 holds data of 32 bytes in one track and in one CD frame, +/−11 CD frames as margin in 108 CD frames of interleaving length, and 32×(108+11+11)=4160 bytes. The head data memory 9 holds 3424 bytes in 107 CD frames. The capacity required for reproducing data of three tracks simultaneously is 4160×3+3424×2= 19328 bytes (the head data memory 9 is not needed for the portion of the foremost track) in the total of the capacity of frame data buffer memory 4 and head data memory 9.

Without using the head data memory 9, the minimum limit of memory capacity is 4160×3=12480 bytes.

On the other hand, the capacity of the buffer memory 11 of the data aligning means 6 is 171 Kbytes/sec×0.29 sec= about 50 Kbytes. Because the actual time required for one rotation is about 290 ms in the case of normal speed reproduction near the outermost periphery of the disk in the case of a disk with linear velocity of 1.25 m/sec Also because the data reading speed per second in standard speed mode of CD is 171 Kbytes according to the standard. Assuming the number of tracks that can be read simultaneously is three, the capacity per revolution is 50 k×3=150 Kbytes, and further considering that the data for two tracks may be left over at maximum on the buffer memory 11 when advancing the reading tracks, the capacity of 150 k+50 k×2=250 Kbytes is needed at maximum. In this example, the buffer memory capacity is 256 Kbytes.

Comparing it with the conventional method of aligning before CIRC error correction, in the CIRC error correction, since a parity of 4 bytes each of C1, C2 is added to the data of 24 bytes, a buffer memory for data aligning needs about 1.33 times or 333 Kbytes. Usually, buffer memories for ECC and data transfer are further needed. Thus, when 128 Kbytes—generally required in the case of ATAPI interface—is maintained, a total of 460 Kbytes is needed.

In this embodiment, therefore, 262 Kbytes is necessary in total if the head data memory 9 is not used, or 269 Kbytes necessary in total if the head data memory 9 is used, and in the conventional method of aligning before CIRC error correction, 460 Kbytes in total is needed. Therefore the memory capacity can be curtailed by about 40%. Thus, since the buffer memory 11 for data aligning also serves as the buffer memory for ECC error correction and data transfer, extra buffer memory for ECC error correction or data transfer is not necessary. The buffer memory for data transfer is large in capacity, so that the data can be transferred efficient to outside of the reading device.

The multi-track disk reproducing apparatus explained in the foregoing embodiments can be used as an auxiliary memory for the computer connected to the host computer through the interface means. The data output means can transfer the aligned valid data on the buffer memory to the host computer.

INDUSTRIAL APPLICABILITY

As described herein, according to the invention, data reproduction, decoding and error correction are executed simultaneously. Data reading is restarted immediately after a track-jump. Therefore the data is read efficiently. The data simultaneously read is aligned by using the data of lower redundancy, so that the capacity of the buffer memory for data alignment can be curtailed. Moreover, since the buffer memory for data aligning serves also as the buffer memory for data transfer, extra buffer memory for data transfer is not necessary. Further, the buffer memory for data output of large capacity is maintained, so that the data can be output to the outside of the reading device efficiently.

What is claimed is:

1. A multi-track disk reproducing apparatus for reproducing simultaneously signals in plural adjacent tracks on an information disk in which plural spiral tracks are formed on the recording surface and data coded by interleaving technique as well as adding error correction information is recorded comprising:

signal reproducing means for reproducing simultaneously signals in plural adjacent tracks from the information disk;

data converting means for converting the read signals of the plural tracks reproduced by said signal reproducing means into digital data;

memory means for storing the read data of the plural tracks converted into digital data by said data converting means by more than an interleaving length;

decoding means for decoding and outputting desired data out of the data stored in said memory means;

data aligning means for aligning the data output in parallel from said decoding means in a sequence of addresses on said information disk; and data output means for outputting valid data aligned by said data aligning means to the outside of said disk reproducing apparatus, wherein after reading the data of the plural tracks to the end of each track, head data of a track to be connected thereto is read in duplicate by more than the interleaving length of the tail data of said each track, and the data of said each track is decoded to the end, and output to the data aligning means.

2. A multi-track disk reproducing apparatus for reproducing simultaneously signals in plural adjacent tracks on an information disk in which plural spiral tracks are formed on the recording surface and data coded by interleaving technique as well as adding error correction information is recorded comprising:

signal reproducing means for reproducing simultaneously signals in plural adjacent tracks from the information disk;

data converting means for converting the read signals of the plural tracks reproduced by said signal reproducing means into digital data;

memory means for storing the read data of the plural tracks converted into digital data by said data converting means by more than an interleaving length;

head region memory means for storing the data more than the interleaving length from the head of each track;

decoding means for decoding and. outputting desired data out of the data stored in said memory means;

data aligning means for aligning the data output in parallel from said decoding means in a sequence of addresses on said information disk; and data output means for outputting valid data aligned by said data aligning means to the outside of said disk reproducing apparatus, wherein after reading the data of the plural tracks to the end of each track, the data stored in said head region memory means of a track to be connected thereto is used as the tail data of said each track.

3. The multi-track disk reproducing apparatus of claim 2, wherein said, head region memory means stores the data more than the interleaving length from the head of each track of other than the foremost track.

4. The multi-track disk reproducing apparatus of any one of claims 1 and 2, wherein said memory means is a ring buffer, and when new data is fed after the buffer capacity is full, the data is erased sequentially from the foremost data.

5. The multi-track disk reproducing apparatus of any one of claims 1 and 2, wherein said decoding means is provided by the number of tracks that can be reproduced simultaneously, independently for each track.

6. The multi-track disk reproducing apparatus of any one of claims 1 and 2, wherein said decoding means is provided by a number smaller than the number of tracks that can be reproduced simultaneously, and decodes and outputs the data sequentially assigned to each track.

7. A multi-track disk reproducing apparatus for reproducing simultaneously signals in plural adjacent tracks on an information disk in which plural spiral tracks are formed on the recording surface comprising:

data reading means for reproducing simultaneously, data in plural adjacent tracks and outputting digital data in parallel;

a buffer memory for storing the data being read out in parallel by said data reading means;

buffer memory address determining means for determining a head address of each track on said buffer memory so that the stored data may be continuous with the data of the track to be connected after one rotation of the disk, on said buffer memory, according to the head address information of each track;

memory writing means for writing data of each track sequentially from the head address of the buffer memory determined by said buffer memory address determining means;

address memory means for storing the tail address on said buffer memory maintaining continuity from the head data by connecting to the data of the foremost track of the reading tracks; and output means for outputting valid aligned data out of the aligned data to the outside of said disk reproducing apparatus, wherein the valid aligned data is the data from the head of the data on the buffer memory up to the address stored in said address memory means.

8. The multitrack disk reproducing apparatus of claim 7, wherein said information disk records the data adding block completion type error correction code in a block unit of a specific length, and said multi-track disk reproducing apparatus further comprises:

error correcting means for correcting error if there is an error, sequentially from the block gathering data in said block of a specific length out of the data written into said buffer memory from the track;

address memory means for storing the tail address on the buffer memory of the sector connected to the data of the foremost track of the reading tracks, maintained in continuity from the head data, and after error correction or free from error; and output means for outputting the portion excluding the error correction code of the valid aligned data of the aligned data selectively to the outside of said disk reproducing apparatus, wherein the valid aligned data is the data from the head of the data on the buffer memory up to the address stored in said address memory means.

9. The multi-track disk reproducing apparatus of any one of claims 1 and 2, wherein said data aligning means includes:

a buffer memory for storing the data being read out in parallel;

buffer memory address determining means for determining the head address of each track on said buffer memory so as to be continuous with the data of the track to be connected after one rotation of the disk, on said buffer memory, according to the head address information of each track;

memory writing means for writing data of each track sequentially from the head address of the buffer memory determined by said buffer memory address determining means; and address memory means for storing the tail address on the buffer memory maintained in continuity from the head data being connected to the data of the foremost track of the reading tracks, wherein the valid aligned data is the data from the head of the data on the buffer memory up to the address stored in said address memory means.

10. The multi-track disk reproducing apparatus of any one of claims 1 and 2, wherein said information disk is recorded by adding block completion type error correction code in a block unit of a specific length, and said data aligning means comprises:

a buffer memory for storing the data being read out parallel;

buffer memory address determining means for determining the head address of each track on said buffer memory so as to be continuous with the data of the track to be connected after one rotation of the disk, on said buffer memory, according to the head address information of each track;

memory writing means for writing data of each track sequentially from the head address of the buffer memory determined by said buffer memory address determining means;

error correcting means for correcting error and writing in duplicate on the data having error if there is an error, sequentially from the block gathering data in said block of a specific length out of the data written into the buffer memory from each track; and address memory means for storing the tail address on the buffer memory of the sector connected to the data of the foremost track of the reading tracks, maintained in continuity from the head data, and after error correction or free from error, wherein the valid aligned data is the data from the head of the data on the buffer memory up to the address stored in said address memory means.

11. The multi-track disk reproducing apparatus of any one of claims 1, 2 and 7, wherein when making a track, the rearmost reading means is caused to jump to a track behind the intended reading start address, and reading of the data in each track is started right after the track-jump.

12. The multi-track disk reproducing apparatus of claim 7, wherein if the data duplicating with the read data is present on said buffer memory, the head address of each track on the buffer memory is determined so that the data may be continuous, with the data on the buffer memory matched with the address on the disk of the reading data.

13. The multi-track disk reproducing apparatus of any one of claims 1, 2 and 7, wherein the multi-track disk reproducing apparatus is an auxiliary memory for a computer connected to a host computer through interface means, and said data output means transfers the valid aligned data on the buffer memory to said host computer.

14. The multi-track disk reproducing apparatus of any one of claims 1 and 2, wherein said information disk is a CD or CD-ROM, and is coded by CIRC coding technique.

15. The multi-track disk reproducing apparatus of any one of claims 1, 2 and 7, wherein said information disk is a disk conforming to CD-ROM standard, and a block of a specific length, to which the block completion type error correction code is added, is a block called a sector composed of 2340 bytes.

16. A multi-track disk reproducing method for reproducing simultaneously signals in plural adjacent tracks on an information disk in which plural spiral tracks are formed on the recording surface, and data coded by interleaving technique as well as adding error correction information is comprising the steps of:

a) reproducing parallel signals in plural adjacent tracks from the information disk;

b) converting the read signals of the plural tracks reproduced at said step a) into digital data;

c) storing the read data of the plural tracks converted into digital data at said step b) by more than an interleaving length;

d) decoding and outputting desired data out of the data stored at said step c);

e) aligning the data output in parallel at said step d) in a sequence of addresses on said information disk; and f) outputting the valid data aligned at said step e), wherein after reading the data of the plural tracks to the end of each track, head data of the track to be connected thereto is read in duplicate by more than the interleaving length of the tail data of said each track, and the data of said each track is decoded to the end, and output to the data aligning means.

17. A multi-track disk reproducing method for reproducing simultaneously signals in plural adjacent tracks on an information disk in which plural spiral tracks are formed on the recording surface, and data coded by interleaving technique as well as adding error correction information is recorded comprising the steps of:

a) reproducing simultaneously signals in plural adjacent tracks from the information disk;

b) converting the read signals of the plural tracks reproduced at said step a) into digital data;

c) storing the read data of the plural tracks converted into digital data at said step b) by more than an interleaving length;

g) storing the data more than the interleaving length from the head of each track;

d) decoding and outputting desired data out of the data stored at said step c);

e) aligning the data output in parallel at said step d) in the sequence of addresses on said information disk; and f) outputting valid data aligned at said step e) to the outside of said disk reproducing apparatus, wherein after reading the data of the plural tracks to the end of each track, the data stored in said head region memory means of the track to be connected thereto is used as the tail data of said each track.

18. The multi-track disk reproducing method of claim 17, wherein said step g) stores the data more than the interleaving length from the head of each track of other than the foremost track.

19. The multi-track disk reproducing apparatus of any one of claims 16 and 17, wherein when new data is fed after the buffer capacity is full, the data is erased sequentially from the foremost data.

20. The multi-track disk reproducing apparatus of any one of claims 16 and 17, wherein said step d) is to decode by decoding means provided by the number of tracks that can be reproduced simultaneously, independently for each track.

21. The multi-track disk reproducing apparatus of any one of claims 16 and 17, wherein said decoding step d) is provided by a number smaller than the number of tracks that can be reproduced simultaneously, and to decode and output the data sequentially assigned to each track.

22. A multi-track disk reproducing method for reproducing simultaneously signals in plural adjacent tracks on an information disk in which plural spiral tracks are formed on the recording surface comprising:

reproducing simultaneously data in plural adjacent tracks and outputting digital data in parallel;

storing the data being read out in parallel at said data outputting step in a buffer memory;

determining the head address of each track on said buffer memory so that the stored data may be continuous with the data of the track to be connected after one rotation of the disk, on said buffer memory, according to the head address information of each track;

writing data of each track sequentially from the head address of the buffer memory determined at said buffer memory address determining step;

storing the tail address on said buffer memory maintaining continuity from the head address by connecting to the data of the foremost track of the reading tracks; and outputting valid aligned data out of the aligned data, wherein the valid aligned data is the data from the head of the data on the buffer memory up to the address stored at said address memory step.

23. The multi-track disk reproducing method of claim 22, wherein said information disk records the data adding block completion type error correction code in a block unit of a specific length, and said multi-track disk reproducing method further comprises the steps:

correcting error if there is an error, sequentially from the block gathering data in said block of a specific length out of the data written into said buffer memory from the track;

storing the tail address on the buffer memory of the sector connected to the data of the foremost track of the reading tracks, maintained in continuity from the head data, and after error correction or free from error; and outputting the portion excluding the error correction code of the valid aligned data of the aligned data selectively to the outside of said disk reproducing apparatus, wherein the valid aligned data is the data from the head of the data on the buffer memory up to the address stored at said address memory step.

24. The multi-track disk reproducing apparatus of any one of claims 16 and 17, wherein said aligning step e) further comprises the steps of:

storing the data being read out in parallel in a buffer memory;

determining the head address of each track on said buffer memory so as to be continuous with the data of the track to be connected after one rotation of the disk, on said buffer memory, according the head address information of each track;

writing data of each track sequentially from the head address of the buffer memory determined at said buffer memory address determining step; and storing the tail address on the buffer memory maintained in continuity from the head data by connected to the data of the foremost track of the reading tracks, wherein the valid aligned data is the data from the head of the data on the buffer memory up to the address stored at said address memory step.

25. The multi-track disk reproducing apparatus of any one of claims 16 and 17, wherein said information disk is recorded by adding block completion type error correction code in a block unit of a specific length, and said aligning step e) further comprises the steps of:

storing the data being read out parallel in a buffer memory;

determining the head address of each track on said buffer memory so as to be continuous with the data of the track to be connected after one rotation of the disk, on said buffer memory, according to the head address information of each track;

writing data of each track sequentially from the head address of the buffer memory determined at said buffer memory address determining step;

correcting error and writing in duplicate on the data having error if there is an error, sequentially from the block gathering data in said block of a specific length out of the data written into said buffer memory from each track; and storing the tail address on the buffer memory of the sector connected to the data of the foremost track of the reading tracks, maintained in continuity from the head data, and after error correction or free from error, wherein the valid aligned data is the data from the head of the data on the buffer memory up to the address stored at said address memory step.

26. The multi-track disk reproducing apparatus of any one of claims 16, 17, and 22, wherein when making a track, the rearmost reading means is caused to jump to a track behind the intended reading start address, and reading of the data in each track is started right after the track-jump.

27. The multi-track disk reproducing apparatus of claim 22, wherein if the data duplicating with the read data is present on said buffer memory, the head address of each track on the buffer memory is determined so that the data may be continuous, with the data on the buffer memory matched with the address on the disk of the reading data.

28. The multi-track disk reproducing apparatus of any one of claims 16, 17 and 22, wherein when an auxiliary memory for a computer connected to a host computer through interface means reproduces, at said data output step, the valid aligned data on the buffer memory is transferred to said host computer.

29. The multi-track disk reproducing apparatus of any one of claims 16 and 17, wherein said information disk is a CD or CD-ROM, and is coded by CIRC coding technique.

30. The multi-track disk reproducing apparatus of any one of claims 16, 17 and 22, wherein said information disk is a disk conforming to CD-ROM standard, and a block of a specific length, to which the block completion type error correction code is added, is a block called a sector composed of 2340 bytes.

31. The multi-track disk reproducing apparatus of claim 9, wherein if the data duplicating with the read data is present on said buffer memory, the head address of each track on the buffer memory is determined so that the data may be continuous, with the data on the buffer memory matched with the address on the disk of the reading data.

32. The multi-track disk reproducing apparatus of claim 10, wherein if the data duplicating with the read data is present on said buffer memory, the head address of each track on the buffer memory is determined so that the data may be continuous, with the data on the buffer memory matched with the address on the disk of the reading data.

33. The multi-track disk reproducing apparatus of claim 24, wherein if the data duplicating with the read data is present on said buffer memory, the head address of each track on the buffer memory is determined so that the data may be continuous, with the data on the buffer memory matched with the address on the disk of the reading data.

34. The multi-track disk reproducing apparatus of claim 25, wherein if the data duplicating with the read data is present on said buffer memory, the head address of each track on the buffer memory is determined so that the data may be continuous, with the data on the buffer memory matched with the address on the disk of the reading data.

* * * * *